(12) United States Patent
De Pena et al.

(10) Patent No.: US 10,953,600 B2
(45) Date of Patent: Mar. 23, 2021

(54) GENERATING 3D OBJECTS

(71) Applicant: Hewlett-Packard Development Company, L.P., Houston, TX (US)

(72) Inventors: Alejandro Manuel De Pena, Sant Cugat del Valles (ES); Esteve Comas, Sant Quirze del Valles (ES); Fernando Juan, Viladecavalls (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 590 days.

(21) Appl. No.: 15/544,197

(22) PCT Filed: Jan. 30, 2015

(86) PCT No.: PCT/EP2015/051998
§ 371 (c)(1),
(2) Date: Jul. 17, 2017

(87) PCT Pub. No.: WO2016/119898
PCT Pub. Date: Aug. 4, 2016

(65) Prior Publication Data
US 2017/0368748 A1 Dec. 28, 2017

(51) Int. Cl.
*B29C 64/295* (2017.01)
*B29C 64/165* (2017.01)
*B29C 64/236* (2017.01)
*B33Y 10/00* (2015.01)
*B33Y 30/00* (2015.01)
(Continued)

(52) U.S. Cl.
CPC .......... *B29C 64/295* (2017.08); *B29C 64/165* (2017.08); *B29C 64/232* (2017.08); *B29C 64/236* (2017.08); *B29C 64/264* (2017.08); *B29C 64/393* (2017.08); *B33Y 10/00* (2014.12); *B33Y 30/00* (2014.12); *B33Y 50/02* (2014.12); *B29K 2101/12* (2013.01);
(Continued)

(58) Field of Classification Search
CPC .................................................. B29C 64/295
See application file for complete search history.

(56) References Cited

U.S. PATENT DOCUMENTS 6,217,816 B1   4/2001   Tang
7,515,986 B2   4/2009   Huskamp
(Continued)

FOREIGN PATENT DOCUMENTS

JP   2014527481 A   10/2014
WO   WO-2006122645   11/2006
(Continued)

OTHER PUBLICATIONS

International Search Report and Written Opinion dated Oct. 9, 2015, PCT Patent Application No. PCT/EP2015/051998, filed Jan. 30, 2015, European Patent Office.
(Continued)

*Primary Examiner* — Larry W Thrower
(74) *Attorney, Agent, or Firm* — HP Inc. Patent Department

(57) ABSTRACT

An apparatus (100) for generating three dimensional objects comprises a first scanning carriage (102). The first scanning carriage comprises a first energy source (104) to pre-heat an area of a build surface as the first scanning carriage (102) moves over the build surface.

15 Claims, 11 Drawing Sheets

(51) Int. Cl.
  *B33Y 50/02*    (2015.01)
  *B29C 64/264*   (2017.01)
  *B29C 64/232*   (2017.01)
  *B29C 64/393*   (2017.01)
  *B29K 101/12*   (2006.01)
  *B29K 105/00*   (2006.01)

(52) U.S. Cl.
  CPC .. *B29K 2105/251* (2013.01); *B29K 2995/004* (2013.01); *B29K 2995/0091* (2013.01)

(56) References Cited

U.S. PATENT DOCUMENTS

| | | | |
|---|---|---|---|
| 8,187,521 B2 | 5/2012 | Larsson et al. | |
| 2009/0017220 A1 | 1/2009 | Muller et al. | |
| 2010/0007062 A1* | 1/2010 | Larsson | B22F 3/1055 264/485 |
| 2012/0156516 A1 | 6/2012 | Matsui et al. | |
| 2014/0306379 A1* | 10/2014 | Hartmann | B29C 64/106 264/401 |
| 2015/0165524 A1* | 6/2015 | Ljungblad | B29C 64/153 419/53 |

FOREIGN PATENT DOCUMENTS

| | | | |
|---|---|---|---|
| WO | WO-2008013483 | | 1/2008 |
| WO | WO 2013/029594 | * | 3/2013 |
| WO | WO-2013029594 | | 3/2013 |
| WO | WO-2014071135 | | 5/2014 |
| WO | WO-2014095208 | | 6/2014 |

OTHER PUBLICATIONS

Karl D.D. Willis, et al., "Printed optics: 3D printing of embedded optical elements for interactive devices", Oct. 7-10, 2012, Cambridge, Massachusetts, USA, pp. 10.

* cited by examiner

Preheat an area of a build surface using a first energy source mounted on a first scanning carriage as the scanning carriage is scanned over the build surface — 400

Figure 4

GENERATING 3D OBJECTS

CLAIM FOR PRIORITY

The present application is a national stage filing under 35 U.S.C. § 371 of PCT application number PCT/EP2015/051998, having an international filing date of Jan. 30, 2015, the disclosure of which is hereby incorporated by reference in its entirety.

BACKGROUND

Additive manufacturing systems that generate three-dimensional objects on a layer-by-layer basis have been proposed as a potentially convenient way to produce three-dimensional objects.

In such additive manufacturing systems, energy sources may be used to heat a build material and an agent.

BRIEF DESCRIPTION OF DRAWINGS

For a better understanding of the examples described herein, and to show more clearly how the examples may be carried into effect, reference will now be made, by way of non-limiting examples, to the following drawings in which:

FIG. 4 is a flowchart of a method according to the disclosure;

DETAILED DESCRIPTION

Figure 1A:
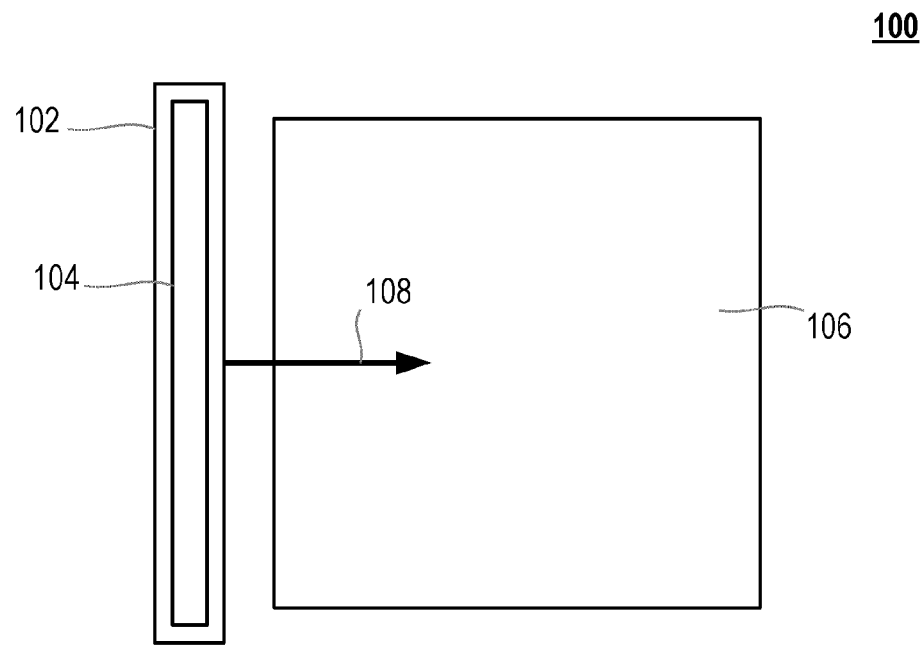
FIG. 1a shows an example of an apparatus for generating a three dimensional object according to the disclosure.

A process of generating a tangible three-dimension object may comprise a series of stages which include forming a layer of build material, selectively delivering an agent (for example a coalescing agent and/or a coalescence modifier agent, or another agent) to at least one portion of a surface of the layer of build material, and temporarily applying energy to the layer of build material. The temporary application of energy may cause portions of the build material on which an agent has been delivered, or has penetrated, to heat up above the point at which the build material and coalescing agent begin to coalesce. This temperature may be referred to as the fusing temperature. Upon cooling, the portions which have coalesced become solid and form part of the three-dimensional object being generated. These stages may then be repeated to form a three-dimensional object. Other stages and procedures may also be used with this process.

In the examples described herein a coalescing agent and coalescence modifier agent can comprise fluids that may be delivered using any appropriate fluid delivery mechanism, also referred to as an agent distributor. In one example the agents are delivered in droplet form. In one example, the coalescing agent may be a strong light absorber such as a pigment colorant.

An agent distributor, according to some examples described herein, may comprise a printhead or printheads, such as thermal printheads or piezoelectric printheads. In one example printheads such as suitable printheads used in commercially available inkjet printers may be used.

A coalescence modifier agent may be used for a variety of purposes. In one example, a coalescence modifier agent may be delivered adjacent to where coalescing agent is delivered, for example to help reduce the effects of lateral coalescence bleed whereby coalescing agent seeps into surrounding build material that is not intended to be fused. This may be used, for example, to improve the definition or accuracy of object edges or surfaces, and/or to reduce surface roughness. In another example, coalescence modifier agent may be delivered interspersed with coalescing agent, which may be used to enable object properties to be modified compared to portions of the object where just coalescing agent has been applied.

In the examples described herein references to a build material may include, for example, a build material that is a powder-based build material. As used herein, the term powder-based material is intended to encompass both dry and wet powder-based materials, particulate materials, and granular materials. In one example the build material may be a normally weakly light absorbing polymer powder medium. In another example the build material may be a thermoplastic.

In the examples described herein, the three dimensional object may be built up by sequentially layering and fusing layers of build material one on top of another. Each layer of build material is deposited over the previous layer and forms a flat surface which is referred to herein as the build surface.

The examples described herein are related to a method and apparatus for controlling temperature in an apparatus for generating a three-dimensional object, wherein the layer of build material is pre-heated to an optimal temperature for product formation. The temporary application of energy applied during fusing is then used to tip the solid material over into its molten state, where the material bonds and cools as a product layer. For semi-crystalline polymers, for example, an optimal pre-heat temperature may be slightly below the melting temperature, $T_m$; for amorphous polymers, for example, an optimal pre-heat temperature may be equal to or just below the glass transition temperature, $T_g$.

According to the disclosure, and the examples which will be described in further detail below, a build surface can be pre-heated by moving an energy source across the build surface. The energy source can be a heating element or lamp or radiation source that heats the build surface, for example, through halogen or infrared radiation.

In some examples, the energy source may be mounted on a carriage moveable over the build surface, referred to herein as a first scanning carriage. The first scanning carriage may restrict the energy source to move linearly along an axis, referred to herein as a first scanning axis. The energy source may be elongated and arranged such that the major axis of the energy source is orthogonal to the scanning axis. As such, the apparatus may be arranged such that, as the first scanning carriage moves along the first scanning axis, the energy source traverses the full area of the build surface. In an example as described above, by placing an energy source (such as a lamp or radiation source) on a scanning carriage, an area of build material can be heated as the first scanning carriage (which may be provided for other reasons, such as distributing agent or build material) moves over a build surface.

Additional equipment may be mounted or form part of the first scanning carriage. For example, the first scanning carriage may be a scanning carriage that comprises an agent distributor for distributing an agent. In some examples, the agent is a coalescing agent and/or coalescence modifier agent as described above. In some examples, the agent distributor may resemble a printhead. The printhead may be a printhead that spans the length of the first scanning carriage (sometimes referred to as a page width printhead), or the printhead may be moveable along an axis orthogonal to the first scanning axis, i.e. the printhead being moveable along the length of the first scanning carriage.

In some examples, a second energy source may be mounted on a second scanning carriage, wherein the second scanning carriage moves across the build surface. The second carriage may be restricted to move along a second scanning axis. In a similar way to the first energy source, the second energy source may be elongated in a direction that is perpendicular to the second scanning axis such that, as the second scanning carriage moves along the second scanning axis, the second energy source traverses the full area of the build surface. In some examples, the first scanning axis is orthogonal to the second scanning axis.

Additional equipment may be mounted on the second scanning carriage. For example, the second scanning carriage may comprise a recoating mechanism for recoating the build surface with the next layer of build material. This recoating mechanism may include a build material distributor for delivering a new layer of build material to the build surface. Suitable build material distributors may include, for example, a wiper blade, a roller or a spray mechanism.

In some examples, the energy sources, agent distributor and recoating mechanisms are on different scanning carriages. In other examples however, the agent distributor and recoating mechanisms are on the same scanning carriage. In one example, the arrangement of the energy sources, distributor and recoating mechanisms across the first and second scanning carriages may be chosen to optimise the speed of the manufacturing process, for example by grouping slow functions such as fusing and recoating on one scanning carriage and other, faster functions, such as agent distribution functions, on another scanning carriage.

In some examples, the first and second scanning carriages may have additional equipment mounted on them. Examples of equipment that may additionally be mounted on the first or second scanning carriages include, but are not limited to at least one additional energy source for pre-heating or fusing, or a heat sensor for determining the temperature distribution across the build surface or portions thereof.

FIG. 1a shows an example of an apparatus 100 for generating a three dimensional object. The apparatus 100 comprises a first scanning carriage 102. The first scanning carriage 102 comprises a first energy source 104 to pre-heat an area of a build surface 106, as the first scanning carriage moves over the build surface during use. The scanning carriage may move over the build surface 106 along a first scanning axis 108 as indicated by the arrow. Thus, the first energy source 104 is drawn over the build surface 106 as the first scanning carriage 102 moves along the first scanning axis and pre-heats the build material and any agents such as coalescing agent and/or coalescence modifier agent on the build surface 106 to an optimal pre-heat temperature.

By placing an energy source, for example a lamp or radiation source, on a scanning carriage that scans across a build surface, this allows an area of build surface to be heated as the scanning carriage moves over the build surface. In an example, this can allow a more accurate pre-heat temperature to be provided, for example compared to a pre-heat temperature provided by a static energy source which resides above the build surface.

Figure 1B:
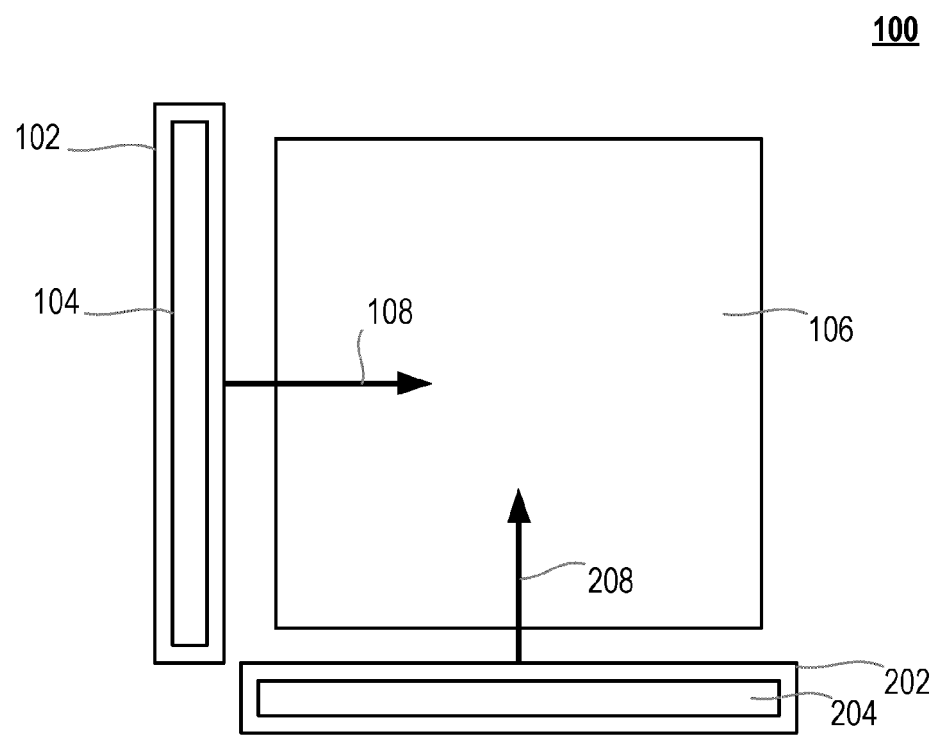
FIG. 1b shows another example of an apparatus for generating a three dimensional object according to the disclosure

In another example, as shown in FIG. 1b, the apparatus may include a second scanning carriage 202, wherein the second scanning carriage 202 comprises a second energy source 204. The second energy source 204 pre-heats an area of build surface as the second scanning carriage 202 moves over the build surface 106, for example along a second scanning axis 208.

In the example of FIG. 1b the first scanning carriage 102 and second scanning carriage 202 are arranged orthogonal to one another. The first scanning carriage 102 moves along a first scanning axis 108 that runs perpendicular to its length, i.e. along the x-axis or horizontal axis of FIG. 1b. The second scanning carriage 202 moves along a second scanning axis 208 that lies perpendicular to the length of the second scanning carriage 202, i.e. along the y-axis or vertical axis of FIG. 1b. In one example the first and second scanning axes are orthogonal to one another.

By providing energy sources on the first and second scanning carriages that move along orthogonal scanning axes, the heat profile of the build surface can be controlled in both directions, such that a desired two dimensional temperature profile can be provided over the build surface, as will be described in greater detail later in the application.

Figure 2:
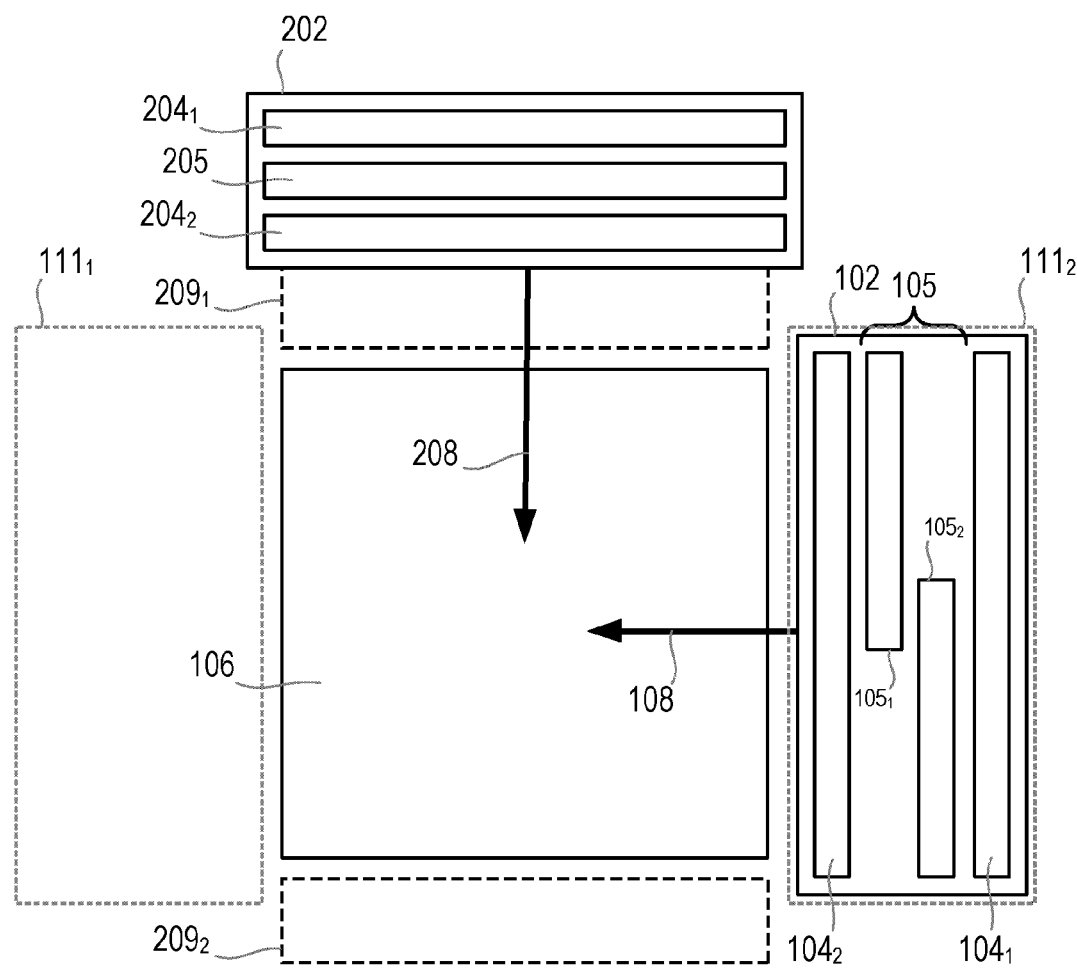
FIG. 2 shows another example of an apparatus for generating a three dimensional object according to the disclosure.

FIG. 2 shows another example of an apparatus 200 for generating a three dimensional object according to the disclosure. In this example, the apparatus 200 comprises a first scanning carriage 102 and a second scanning carriage 202. The first scanning carriage 102 comprises at least one energy source 104, and an agent distributor 105. The agent distributor 105 may comprise, for example, a printhead comprising a first printhead segment $105_1$ and a second printhead segment $105_2$, which may overlap such that the printhead 105 spans the width of the build surface as the first scanning carriage 102 scans along the first scanning axis 108. Other printhead arrangements may also be used such as a single printhead that spans the whole width of the build surface, 106. The agent distributor 105 distributes agents such as coalescing agent and/or coalescence modifier agent onto a build surface. The second scanning carriage 202 comprises at least one energy source 204, and a build material distributor (or recoating mechanism) 205. The build material distributor 205 may have features as described above.

In the example of FIG. 2, the first energy source 104 of the first scanning carriage 102 comprises a first energy source element $104_1$ and a second energy source element $104_2$. The first energy source element $104_1$ and the second energy source element $104_2$ of the first scanning carriage 102 may be arranged, for example, on either side of the agent distributor 105. Such an arrangement allows energy to be selectively applied upstream and/or downstream of the agent distributor 105 as the agent distributor 105 moves back and forth along the first scanning axis 108 during use, further details of which will be described in FIGS. 3a to 3d below. As such, a first energy source 104 is arranged on an upstream side and/or a downstream side of the agent distributor 105, with respect to how the first scanning carriage 102 moves across the build surface during use.

In the example of FIG. 2, the second energy source 204 of the second scanning carriage 202 comprises a first energy source element $204_1$ and a second energy source element $204_2$. The first energy source element $204_1$ and the second energy source element $204_2$ of the second scanning carriage 202 may be arranged, for example, on either side of the build material distributor 205. Such an arrangement allows energy to be selectively applied upstream and/or downstream of the build material distributor 205 as the build material distributor 205 moves back and forth along the second scanning axis 208 during use, further details of which will also be described in FIGS. 3a to 3d below. As such, a second energy source 204 is arranged on an upstream side and/or a downstream side of the build material distributor 205, with respect to how the second scanning carriage 202 moves across the build surface during use.

The first and second scanning carriages 102, 202 move, during use, across a build surface 106. The energy sources 104, 204 may be elongated and lie along the full lengths of their respective scanning carriages. As such, as each scanning carriage moves from one side of the build surface to the other along its scanning axis, the respective energy sources pass across the entire build surface 106, heating the build material and any agents such as coalescing agent and/or coalescence modifier agent on the build surface as they go. In one example, when not moving across the build surface, the first scanning carriage 102 may rest at a parking station or service station $111_1$ or $111_2$, (for example which services the agent distributor). Likewise, when not moving across the build surface, the second scanning carriage 202 may rest at supply station $209_1$ or $209_2$, (for example which supplies build material to the build material distributor).

The energy sources on the first and second scanning carriages may heat the build surface to the same temperature, or heat the build surface to different temperatures. In one example the energy sources may generate a constant amount of energy as they are moved across the build surface. In another example, the energy radiated by an energy source may be changed as the energy source is moved across the build surface, or between different scans of the build surface. The energy output may be adjusted as the energy source is moved across the build surface according to an emissivity profile, such as the emissivity profiles described in detail below with respect to FIGS. 5 to 9. The emissivity profile may be a preconfigured emissivity profile. In one example, the apparatus may additionally include thermal imaging equipment and a processor wherein the thermal imaging equipment measures the temperature profile of the build surface, or a portion thereof, and wherein the processor processes the measured heat profile and calculates an emissivity profile for the pre-heating energy sources, taking the measured heat profile and a reference heat profile into account. The emissivity profile may be calculated in order to selectively heat certain areas of the build surface preferentially over other areas in order to produce a uniform heat distribution or a predetermined heat distribution. The processor may calculate different profiles for each of the energy sources on the first and second scanning carriages. The processor may further calculate the appropriate emissivilty profile of the energy sources in an iterative manner such that it calculates a new profile for every scan across the build surface. In one example the thermal imaging equipment may be mounted onto one or both of the first and second scanning carriages or, in another example, the thermal imaging equipment may be mounted on a separate mount such that it hangs over the build surface in a fixed position.

An energy source may be heated to a first temperature for pre-heating the build surface 106 during a first stage in the process and at a second, higher temperature to fuse a printed layer of build material during a subsequent stage of the process. The energy sources may be heating elements. In another example, the energy sources may be lamps, or other forms of radiation sources. More detail on the heating regimes and emissivity profiles of the energy sources is provided in the detailed examples below.

FIGS. 3a to 3d show an example of the operation of an apparatus such as that shown in FIG. 2. In a first stage shown in FIG. 3a, the first scanning carriage 102 is shown in the process of moving out from a service station $111_2$. During this phase of the build operation, the first scanning carriage 102 moves across the build surface 106, from right to left, along the first scanning axis 108 as illustrated by the arrow. Prior to the first scanning carriage 102 moving in this direction, the build surface 106 will already contain a fresh layer of build material, which has been previously deposited by the build material distributor 205 mounted on the second scanning carriage 202. As the first scanning carriage 102 moves across the build surface 106, the agent distributor 105 (for example comprising first and second printhead segments $105_1$, $105_2$) deposits or prints at least one agent, such as coalescing agent and/or a coalescence modifier agent onto certain areas of the build surface 106, i.e. onto certain areas according to the particular 3D object that is being generated. In one example, the first energy source element $104_1$ of the first energy source 104, i.e. the energy source that lies upstream of the agent distributor 105 as the agent distributor 105 moves from right to left along the first scanning axis 108 during this scanning operation, pre-heats the build surface 106 during the scanning operation, which includes pre-heating the build material and the freshly deposited agent(s). In this example, although no energy is emitted from the second energy source element $104_2$ as the first scanning carriage 102 scans from right to left, it is noted that energy may be radiated from this energy source element too, for example if some form of pre-heating is desired prior to distributing an agent.

Figure 3A:
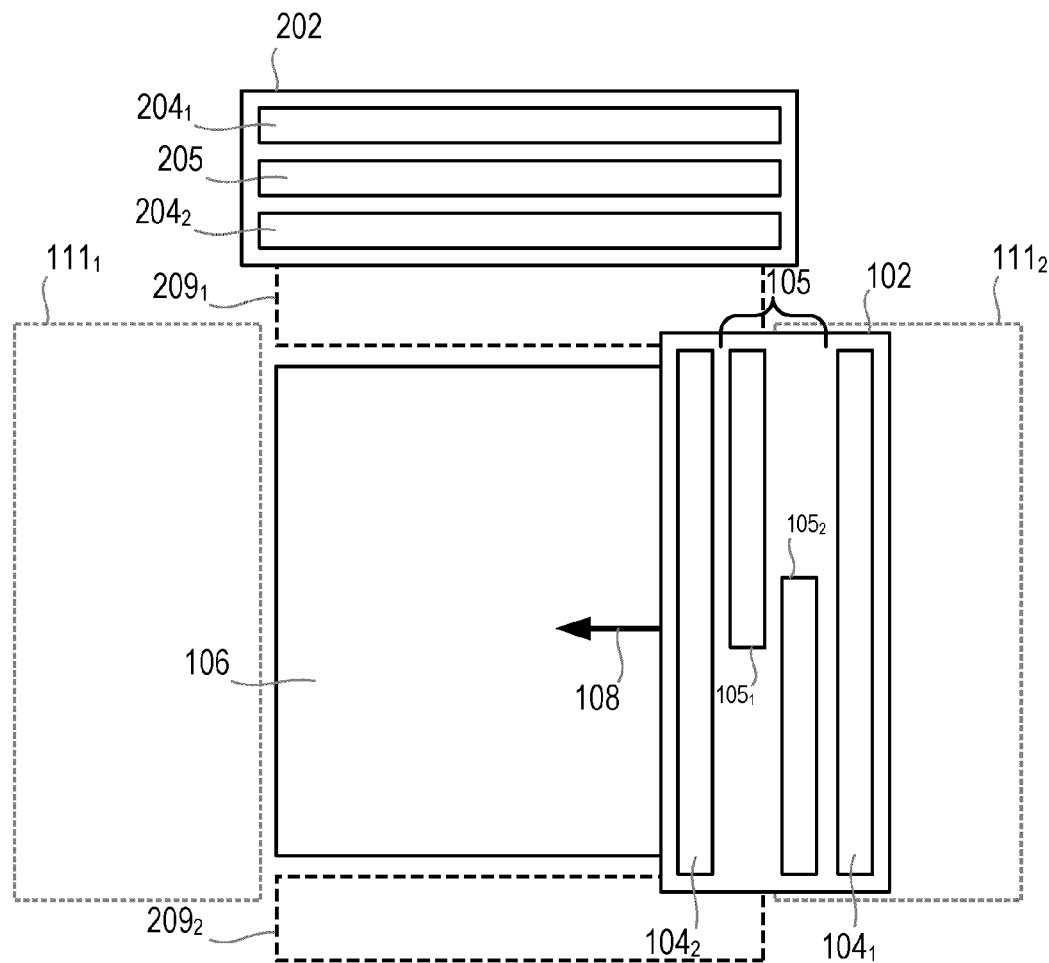
FIGS. 3a to 3d show an example of how the apparatus of FIG. 2 may be used to generate a three dimensional object.
Figure 3B:
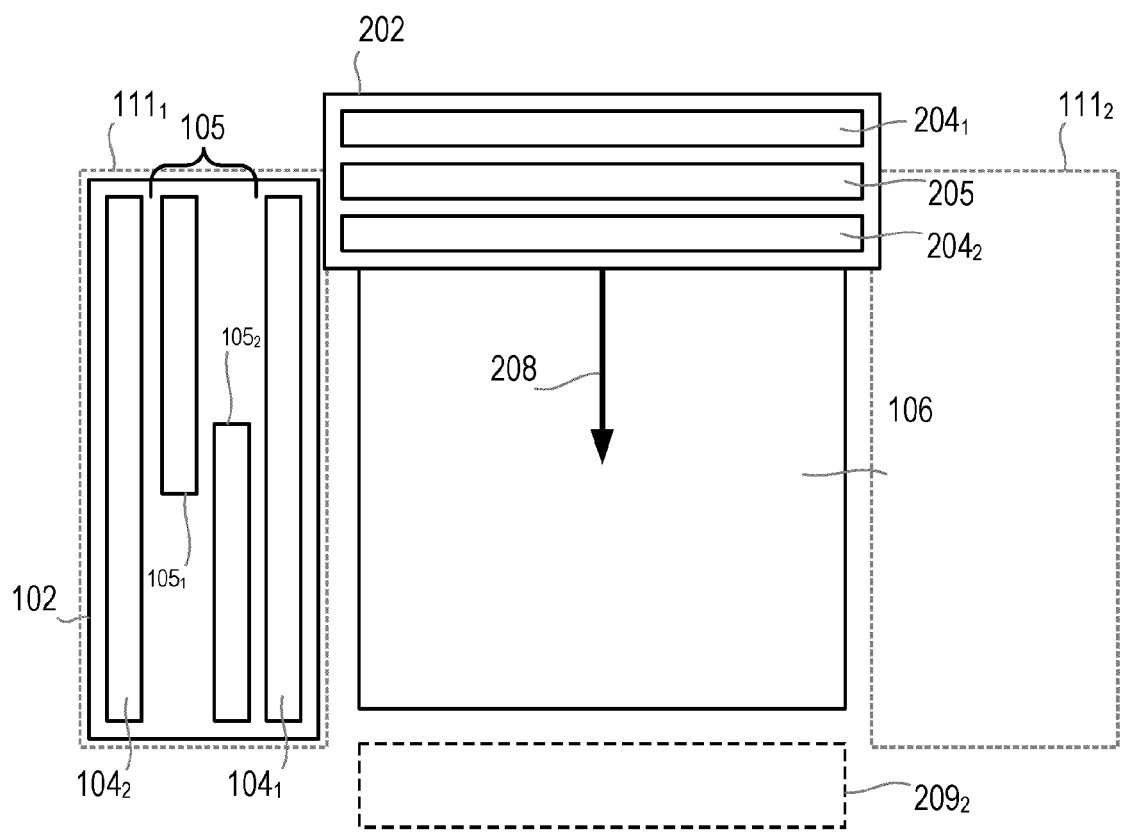

When the first scanning carriage 102 has passed across the build surface 106 and reached the service station $111_1$ shown on the left hand side, in a second stage of the build operation, as shown in FIG. 3b, the second scanning carriage 202 moves along the second scanning axis 208 over the build material 106, as indicated by the arrow directed from the top of the page towards the bottom of the page. Prior to moving in this direction, the second scanning carriage 202 may have acquired additional build material from a build material supply station 209₁ (as shown in FIG. 3a, but hidden behind the second scanning carriage 202 in FIG. 3b)

During this pass across the build surface 106, the second energy source element 204₂ of the second carriage 204 is heated to a first temperature for heating the build surface to a fusing temperature of the treated build material. Whilst at this temperature, regions where coalescing agent have just been applied according to FIG. 3a will melt when the second energy source element 204₂ of the second carriage 204 is passed over them, but areas where no coalescing agent has been applied, i.e. areas of 'raw' build material, will not melt and instead will remain unfused. During this pass across the build surface, the build material distributor 205 may also distribute a new layer of build material. Furthermore, during this pass of the build surface, the first energy source element 204₁ of the second scanning carriage 204, i.e. the energy source element which lies upstream of the build material distributor 205, may be heated to a second temperature corresponding to the pre-heating temperature of the build material. As noted above, an optimal pre-heating temperature may be slightly below the melting temperature, $T_m$, for example, for semi-crystalline polymers, and may be just below the glass transition temperature, for example, for amorphous polymers. Neither treated nor untreated 'raw' build material melts as the first energy source element 204₁ is passed over the build surface at this temperature, rather (as noted above) it is used to pre-heat the build material (for example uniformly pre-heat the build material), which in an example can help create good part quality by reducing the effects of inhomogeneous contraction phenomena.

With the second energy source element 204₂ and first energy source element 204₁ of the second scanning carriage 202 heated to the optimal fusing and pre-heating temperatures, respectively, three things happen in this example as the second scanning carriage 202 moves across the build surface 106. Firstly, the second energy source element 204₂ heats the printed layer of build material to the fusing temperature. The printed layer contains the agents such as coalescing agent and/or coalescence modifier agent as printed by the first scanning carriage 102 in the stage illustrated in FIG. 3a and as a result, as the second energy source element 204₂ of the second scanning carriage 202 passes over the build surface, areas that have been printed with agent are heated to the fusing temperature, melt and fuse together. At this point, this particular portion of this particular layer of build material has been processed.

Upstream of the second energy source element 204₂, the build material distributor 205 follows the second energy source element 204₂ across the finished layer, laying a new layer of build material over the old layer.

In a third action, upstream of the build material distributor 205, the first energy source element 204₁ of the second scanning carriage 202 pre-heats the freshly laid layer of build material, for example to the optimal pre-heating temperature, ready for printing.

Figure 3C:
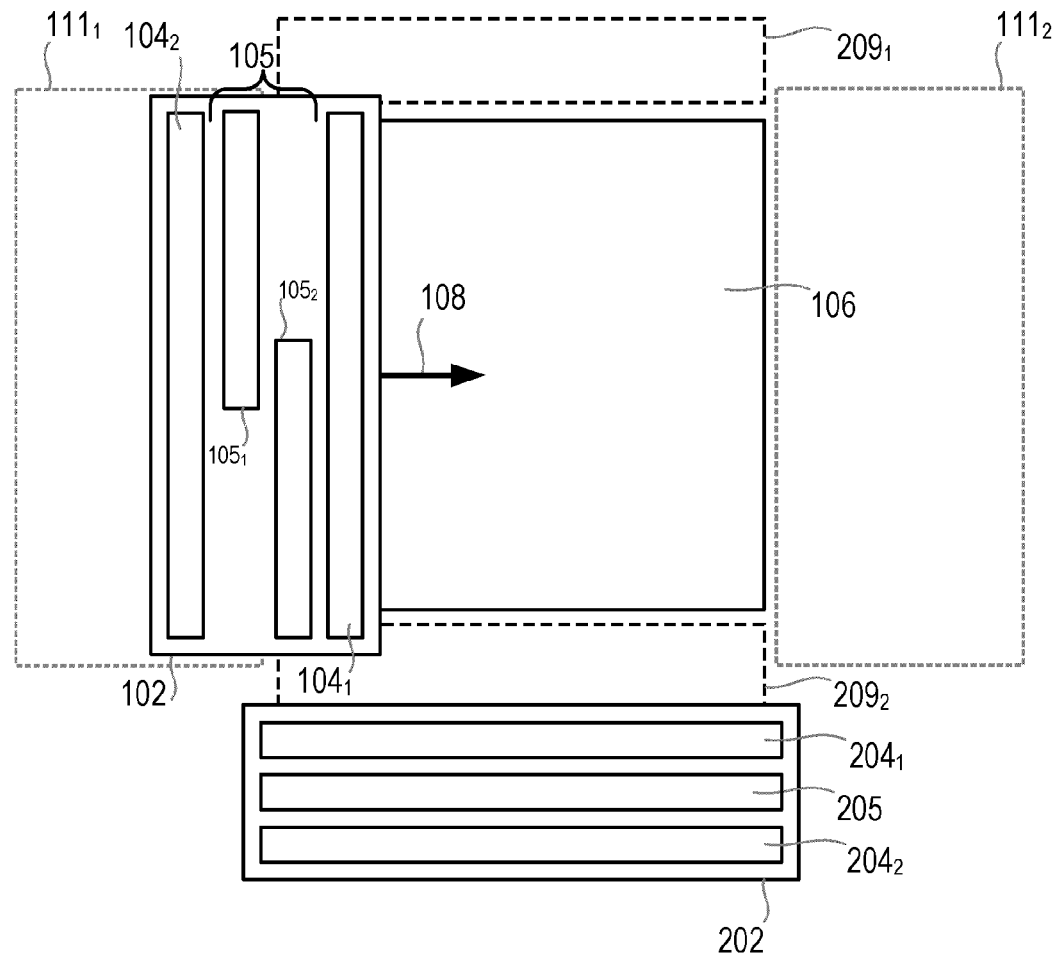

Once the second scanning carriage 202 has fully passed across the build surface 106, as illustrated from top to bottom on the page, it stops at the lower side of the build surface, for example near a build material supply station 209₂, and the build process moves on to FIG. 3c.

FIG. 3c shows the first scanning carriage 102 moving back across the build surface 106, this time from left to right. As in FIG. 3a, as the first scanning carriage 102 moves across the build surface 106, the agent distributor 105 prints or deposits agent (e.g. coalescing agent and/or coalescence modifier agent) onto certain portions of the build surface. A first energy source element 104₁ and/or a second energy source element 104₂ of the first scanning carriage 104, mounted either side of the agent distributor 105, pre-heat the build surface and freshly deposited print agents, for example to an optimal pre-heating temperature.

Figure 3D:
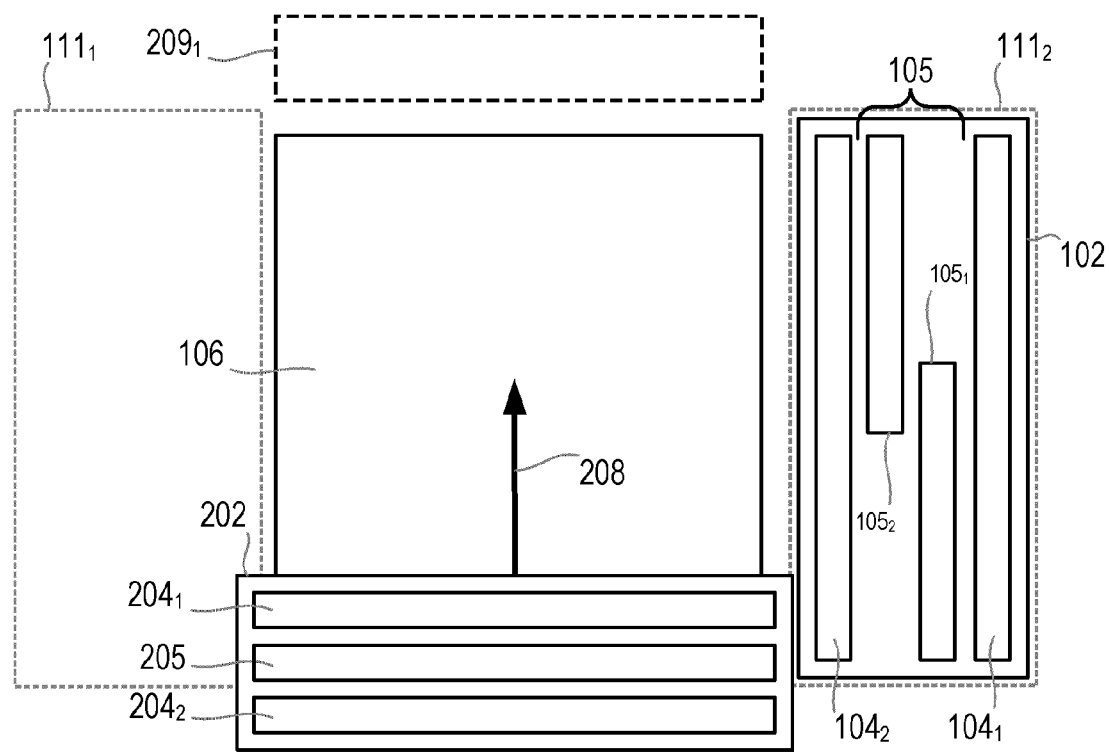

In a fourth stage of the build process shown in FIG. 3d, the second scanning carriage 202 scans back across the print surface, illustrated by the second scanning carriage 202 moving up the page in FIG. 3d. During this scanning operation, the energy outputs of the energy source elements 204₁ and 204₂ are reversed to what they were in FIG. 3b, such that the first energy source element 204₁ heats the build surface to the fusing temperature and the second energy source element 204₂ heats the build surface to the pre-heating temperature. This is done to reflect the fact that the second scanning carriage is moving across the build surface in the reverse direction to what it was in FIG. 3b and thus to ensure that for each segment of build material, the fusing, recoating and pre-heating stages described above are still performed in the same order as was indicated for FIG. 3b.

The switching of the temperatures in this way means that, irrespective of the direction of travel of the second scanning carriage 202, the energy source 204 positioned downstream of the build material distributor 205 is heated to the fusing temperature. This ensures that the previous layer of printed build material is fused before the next layer of build material is added. Conversely, the energy source 204 positioned upstream of the build material distributor 205 with respect to the direction of travel of the scanning carriage, is heated to the pre-heating temperature. This allows the layers of freshly laid build material to be pre-heated as soon as they are applied to the build surface.

The process described in FIGS. 3a to 3d may be repeated for subsequent layers of the 3D product being generated.

It should be noted that the process outlined in FIGS. 3a to 3d is offered merely as an example of a possible process according to the disclosure and that other examples are also envisioned. For example, the build material distributor 205, agent distributor 105 and energy sources may be arranged in a different way to that represented in FIGS. 3a to 3d. Furthermore, at least one component may be located on a separate carriage to the other components, or on different carriages to those shown in FIGS. 3a to 3d. For instance, an energy source positioned downstream of the agent distributor (printheads) may be heated to the fusing temperature such that the stages of printing and fusing are performed by equipment on a single carriage. In that case, the energy sources on the second scanning carriage 202 may both be set to the pre-heating temperature.

Furthermore, in the example in FIGS. 3a to 3d, the scanning carriages may scan in the same plane, and to move sequentially across the build surface, such that as soon as the first scanning carriage has passed from one side to another, the next carriage begins to move. In such an example this makes the process efficient by speeding up the process and preventing time from being wasted between sweeps of the build surface. In another example, however, a scanning carriage may pass across the build surface and return back to its starting point before the second carriage begins to move. In such an example system, the build material distributor 205, energy sources 104, 204 and agent distributor 105 would act on the build surface whilst the scanning carriage is moving in a single direction, and therefore the first scanning carriage 102 and/or second scanning carriage 202 may contain a single pre-heating energy source upstream of the respective agent distributor or build material distributor, rather than a pre-heating energy source on both sides of the respective agent distributor and build material distributor as shown in FIGS. 2 and 3a to 3d. In another example, the first and second scanning carriages may scan across the build surface in different planes.

Turning now to FIG. 4, an example of a method according to the current disclosure is provided. The method comprises pre-heating an area of a build surface using a first energy source mounted on a first scanning carriage, as the first scanning carriage is scanned over a build surface. The scanning carriage may scan across the full area of the build surface, or just selected subsections. Similarly, the full area of the build surface may be pre-heated during pre-heating, or just selected subsections.

In one example, the method may also include pre-heating an area of a build surface using a second energy source, the second energy source being mounted on a second scanning carriage that is scanned across the build surface. In a similar manner to the first scanning carriage, the second scanning carriage may scan across the full area of the build surface, or just selected subsections. Similarly, the energy output of the energy sources can be modulated such that the full area of the build surface may be pre-heated during pre-heating, or just selected subsections.

The method may include scanning along an axis and the first and second scanning carriages may be constrained to move linearly along such a scanning axis. In one example, the first and second scanning carriages are constrained to move along separate axes that are orthogonal to one another.

The build material (or powder layer) pre-heating concept proposed in some examples of this disclosure benefit from the energy sources being arranged over two orthogonal axes. This has the advantage that the energy sources can be incorporated into products with orthogonal scanning.

In order to provide uniform pre-heating across the whole of the build surface, the energy source may be shaped such that it spans the full width of the build surface at all points. For example, the energy source may be elongated and arranged such that its major axis lies perpendicular to the scanning axis of the respective scanning carriage to which it is attached. For example, the energy source may be a tube shaped lamp. In some examples, the energy source may be split into segments where the temperature of each segment is controllable independently of the other segments. This is described later in the application in relation to FIG. 10.

In some examples, the method further comprises controlling the energy radiated by an energy source as it moves across the build surface. For example, the energy source may be controlled such that the temperature is higher when heating the edge regions (where a higher level of heat dissipation is likely to occur) and cooler when heating central regions. In an orthogonal layout, this means that the temperature distribution on the build surface can be controlled in two dimensions by shaping the temporal profile of the radiation intensity of each energy source.

FIGS. 5 to 9 show examples of temperature distributions that can be obtained across the build surface by modulating the emissivity profiles of the pre-heating energy sources (heating elements) on the two orthogonally arranged scanning carriages. The curve at the top of each of FIGS. 5 to 9 indicates the evolution of the emissivity of the energy source aligned parallel to the y axis of the Figure, that scans the powder bed horizontally, moving from the left to the right. The curve on the left of each of FIGS. 5 to 9 denotes the energy emitted by the energy source oriented parallel to the x-axis of the Figure, that moves vertically between the top and the bottom of the build surface. The thermal map then shows the combination resulting from both (top and left) profiles. The thermal maps effectively obey the following functional behaviour:

$$I(x,y)=I_x(t)+I_y(t)$$

where $I_x(t)$ and $I_y(t)$ correspond respectively to the top and left profiles.

Figure 5:
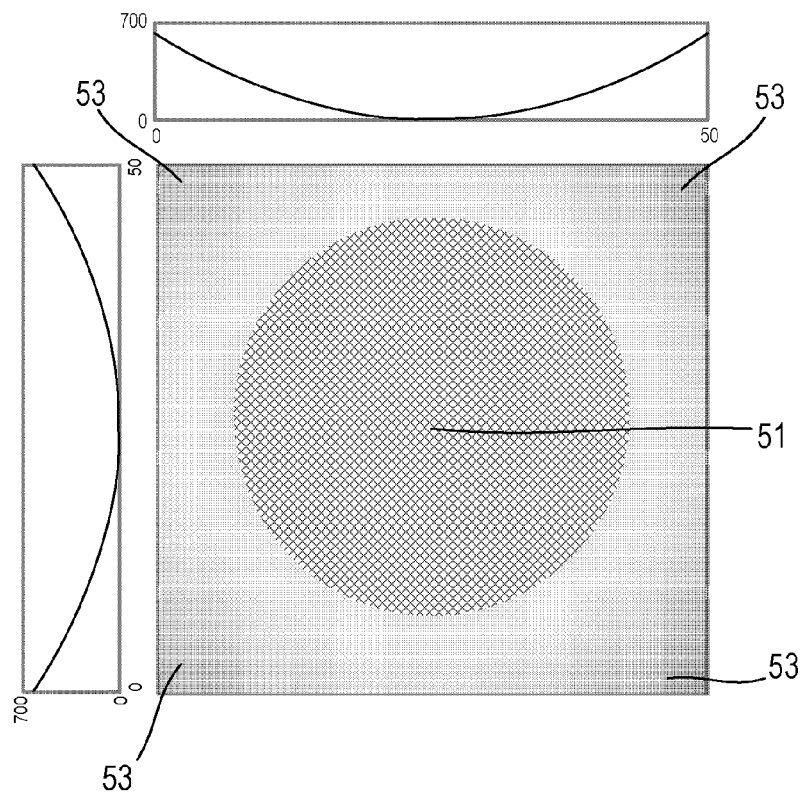
FIG. 5 shows an example heat profile generated on a build surface, for example by controlling the energy radiated by an energy source according to a parabolic profile as the energy source is moved across a build material.

In the example of FIG. 5, both the first energy source on a first scanning carriage and the second energy source on the second scanning carriage are each controlled to fall and rise according to a parabolic profile as the respective energy source moves across a build material. The resulting distribution shown in FIG. 5 concentrates the radiation at the corners and edges of the powder bed, as indicated by the hot regions 53, and cooler region 51, and resembles the input distributions adjusted to compensate for conductive and convective losses.

Figure 6:
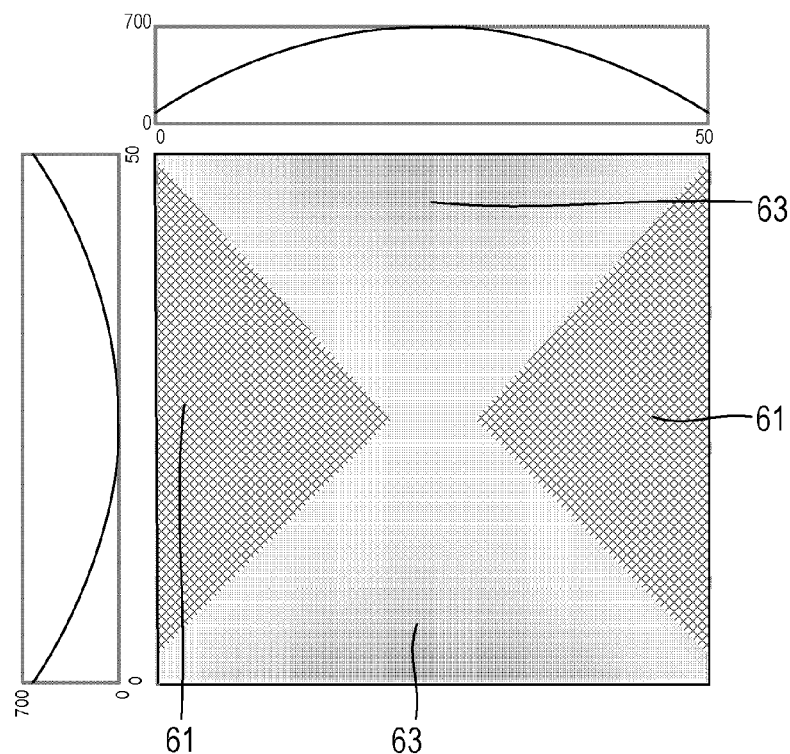
FIG. 6 shows an example heat profile generated on a build surface, for example by controlling the energy radiated by an energy source according to a parabolic profile on a first axis and an inverse parabolic profile on a second axis as the energy source is moved across a build material.

In the example of FIG. 6, the first energy source on a first scanning carriage is controlled to rise and fall according to a parabolic profile as the respective energy source moves across a build material, whereas the second energy source on a second scanning carriage is controlled to fall and rise according to a parabolic profile (a form of inverse parabolic profile) as the respective energy source moves across a build material. Hot regions are indicated by reference numeral 63 and cooler regions by 61.

Figure 7:
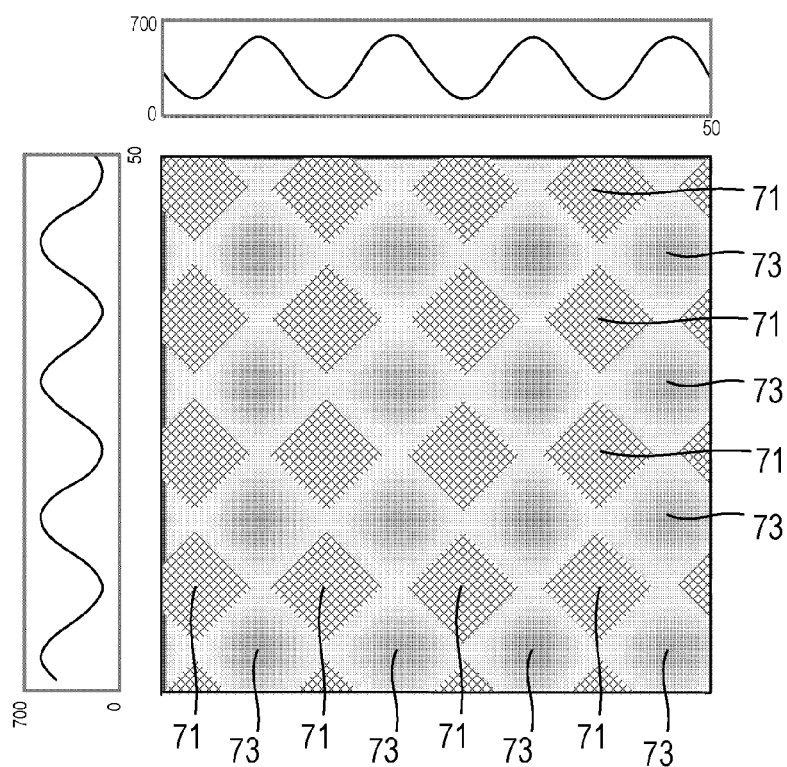
FIG. 7 shows an example heat profile generated on a build surface, for example by controlling the energy radiated by an energy source according to a sinusoidal profile as the energy source is moved across a build material.

In the example of FIG. 7, both the first energy source on a first scanning carriage and second energy source on a second scanning carriage are controlled to vary according to a sinusoidal profile as the energy source moves over a build material. This produces alternating hot zones 73 and cold zones 71

Figure 8:
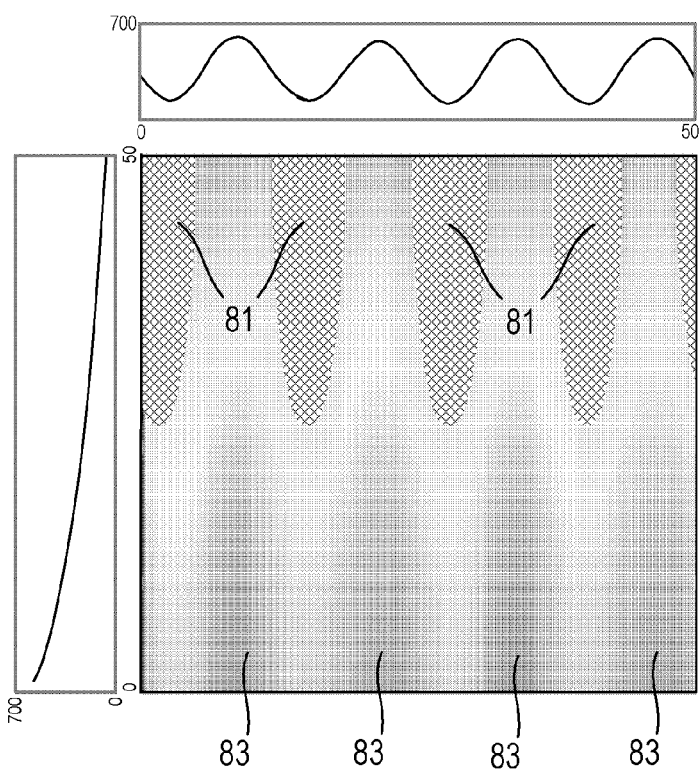
FIG. 8 shows an example heat profile generated on a build surface, for example by controlling the energy radiated by an energy source according to an exponentially decaying profile on a first axis and a sinusoidal profile on a second axis as the energy source is moved across a build material.

In the example of FIG. 8, the first energy source on a first scanning carriage is controlled to vary according to a sinusoidal profile as the first energy source moves over a build material, while the second energy source of the second scanning carriage is controlled to vary according to an exponentially decaying profile as the second energy source moves across a build material. Hot and cold regions are indicated by numerals 83 and 81 respectively.

Figure 9:
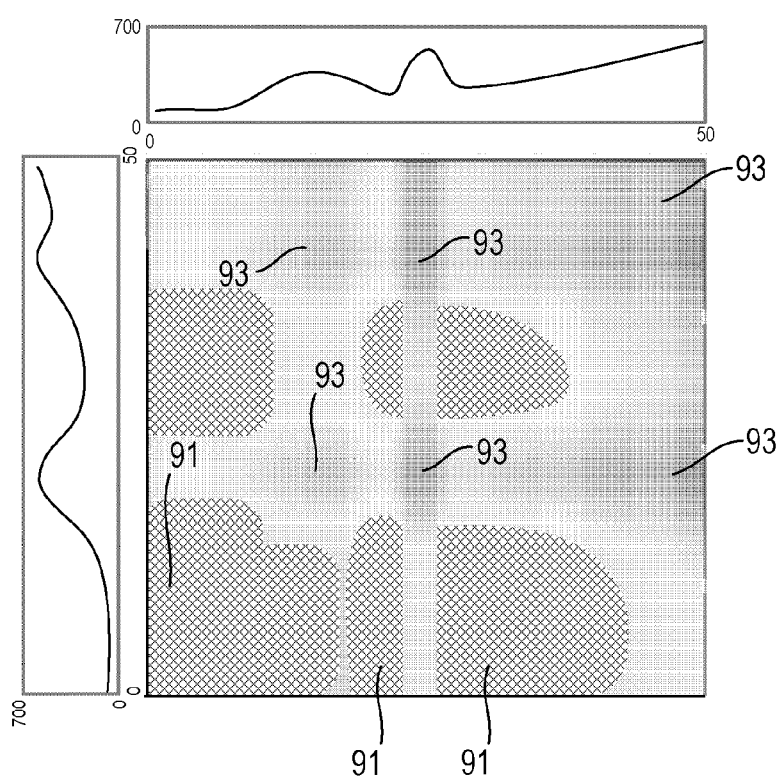
FIG. 9 shows an example heat profile generated on a build surface, for example by controlling the energy radiated by an energy source according to an amplitude modulated and a decaying profile as the energy source is moved across a build material.

In the example of FIG. 9, the first energy source on a first scanning carriage and the second energy source on the second scanning carriage are amplitude modulated with an exponential pedestal. Hot and cold regions are indicated by numerals 93 and 91 respectively.

From the above, it can be seen that appropriate input emissivity functions and the resulting heat profiles of the build surface include, but are not limited to: parabolic and inverse parabolic profiles, sinusoidal profiles, sinusoidally modulated exponential decay profiles, or profiles having some other predetermined characteristic.

The emissivity profile can be adjusted for each energy source over time, for example using a waveform function of the voltage or through pulse width modulation (PWM) of the input power. Controlling the temperature distribution over the time characteristic of the pre-heating energy sources in this way allows the design of quasi-analog compensation schemes at extremely high spatial resolution. The resolution is related to the distance covered by the energy source during the period of a pulse and the thermal inertia (response function) of the energy source which acts as a low-pass filter.

In some examples, the temperature profile of an energy source on a first scanning axis is controlled in relation to the temperature profile of a second energy source on a second scanning axis, orthogonal to the first scanning axis, such that the first temperature profile and the second temperature profile combine to provide a desired pre-heat profile over an area of a build surface.

In one example, the method provided in this disclosure may also include: measuring the temperature profile of the build surface, determining an emissivity profile for an energy source based on the measured temperature profile and a reference profile and applying the determined emissivity profile to the energy source as it is scanned across the build surface. The stage of applying may be achieved, for example, by altering the voltage across the energy source.

The temperature distribution attained across the build surface may be governed by the basic heat balance equation using the radiative heat flux as input parameter.

Figure 10:
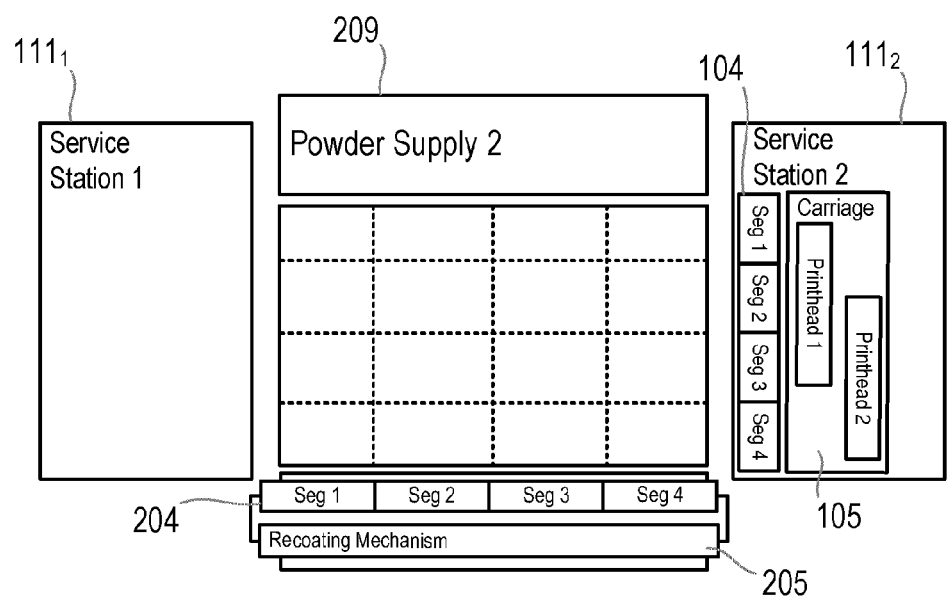
FIG. 10 shows an example apparatus whereby an energy source comprises a plurality of energy source segments.

In another example, the use of emissivity profiles for the energy sources will now be described in relation to FIG. 10 which shows an apparatus similar to that of FIG. 1*a*, 1 *b*, 2 or 3, but modified such that any energy source or energy source element is split into a plurality of energy source segments (for example along the length of an energy source, orthogonal to a scanning axis). The temperature of each segment of the energy source can be controlled independently of the other energy sources so that each segment may have its own emissivity profile (as described above with respect to FIGS. 5 to 9). In this example, the build surface is therefore divided into independently addressable zones.

An advantage according to one example, is that of improving the addressable space of the power distribution profiles and allowing for further design granularity. If n and m are respectively the number of segments of the horizontally and vertically scanning emitter-arrays, the powder bed surface is divided into n×m individually controllable zones, where the radiation profile in each of these zones can be shaped following the functional relation described above:

$$I_{zone}(x,y)=I_{xzone}(t)+I_{yzone}(t).$$

Therefore, according to the disclosure, any of the examples described above with reference to FIG. 1*a*, 1*b*, 2, 3 or 10 may be configured such that the energy radiated by an energy source or an energy source segment is controlled as it moves over a build surface.

The energy radiated by an energy source or an energy source segment, as it moves over a build surface, may be controlled relative to the energy radiated by another energy source or energy source segment as it moves over the build surface.

In such an example the energy sources on separate scanning carriages work in combination to provide a desired temperature at a particular area of the build surface, or over the entire area of the build surface, using the emissivity profiles of first and second energy sources on first and second carriages.

Furthermore, according to one example method, the energy radiated by an energy source or an energy source segment as it moves over a build surface, comprises controlling a first energy source and a second energy source by any combination of: controlling the energy radiated by an energy source or an energy source segment to rise and fall according to a parabolic profile as the energy source or energy source segment moves across a build surface; controlling the energy radiated by an energy source or an energy source segment to fall and rise according to a parabolic profile as the energy source or energy source segment moves across a build surface; controlling the energy radiated by an energy source or an energy source segment to vary according to a sinusoidal profile as the energy source or energy source segment moves across a build surface; controlling the energy radiated by an energy source or an energy source segment to vary according to an exponentially decaying profile as the energy source or energy source segment moves across a build surface; or controlling the energy radiated by an energy source or an energy source segment to be constant as the energy source or energy source segment moves across a build material.

An example described above enables the heat distribution over a build surface of build material to be controlled in an economical way, using quasi-continuous spatial profiles.

An example described above can help reduce perturbations of the optimal pre-heating temperature, which may otherwise reduce the integrity and consistency of the building process as the mechanical properties of the final part and part accuracy can be influenced through inhomogeneous contraction phenomena. To help achieve equal part properties build after build and consistency between systems, the examples described herein allow the pre-heat temperature distribution and evolution on the build surface to be controlled.

It should be noted that the above-mentioned examples illustrate rather than limit the disclosure, and that it may be possible to design many alternative examples without departing from the scope of the appended claims. The word "comprising" does not exclude the presence of elements or stages other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An apparatus for generating a three dimensional object, the apparatus comprising:
   a first scanning carriage; and
   a first energy source mounted on the first scanning carriage, the first energy source to:
      pre-heat an area of a build surface composed of build material to a first temperature below a melting temperature or a glass transition temperature of the build material as the first scanning carriage moves over the build surface during a first stage of use.

2. The apparatus as claimed in claim 1, the apparatus further comprising:
   a second scanning carriage; and
   a second energy source mounted on the second scanning carriage, the second energy source to:
      pre-heat an area of a second build surface composed of the build material to the first temperature below the melting temperature or the glass transition temperature of the build material as the second scanning carriage moves over the build surface during another stage of use; and
      heat the area of the second build surface to a second temperature above the melting temperature or the glass transition temperature of the build material as the second scanning carriage moves over the second build surface during a further stage of use.

3. The apparatus as claimed in claim 2, wherein the first scanning carriage and the second scanning carriage scan, during use, over a first scanning axis and a second scanning axis respectively, the first scanning axis being orthogonal to the second scanning axis.

4. The apparatus as claimed in claim 1, wherein the first energy source spans the width of the build surface, orthogonal to a scanning axis.

5. The apparatus as claimed in claim 1, wherein the first scanning carriage comprises an agent distributor to distribute an agent over the area of the build surface.

6. The apparatus as claimed in claim 5, wherein the first energy source is to heat the area of the build surface to a second temperature above the melting temperature or the glass transition temperature of the build material as the first scanning carriage moves over the build surface during a subsequent stage of use.

7. The apparatus as claimed in claim 2, wherein the second scanning carriage comprises a build material distributor to distribute the build material over the area of the second build surface during use.

8. The apparatus as claimed in claim 7, wherein the second energy source is arranged on an upstream side and/or a downstream side of the build material distributor, with respect to how the second scanning carriage moves across the build surface during use.

9. The apparatus as claimed in claim 8, wherein a first segment of the second energy source is arranged on the upstream side of the build material distributor and as the second scanning carriage moves across the second build surface during use, is controlled to pre-heat the build material as the second scanning carriage scans across the second build surface, and wherein a second segment of the second energy source is arranged on the downstream side of the build material distributor and as the second scanning carriage moves across the build surface during use, is controlled to fuse any areas of build material previously coated with an agent, as the second scanning carriage scans across the second build surface during use.

10. The apparatus as claimed in claim 1, wherein the first energy source comprises a plurality of energy source segments.

11. An apparatus for generating a three dimensional object, the apparatus comprising:
    a first scanning carriage;
    a second scanning carriage;
    a first energy source mounted on the first scanning carriage, the first energy source to:
        pre-heat an area of a build surface composed of build material to a first temperature below a melting temperature or a glass transition temperature of the build material as the first scanning carriage moves over the build surface during a first stage of use; and
    a second energy source mounted on the second scanning carriage, the second energy source to:
        heat the area of the build surface to a second temperature above the melting temperature or the glass transition temperature of the build material as the second scanning carriage moves over the build surface during a subsequent stage of use.

12. The apparatus as claimed in claim 11, wherein the first scanning carriage and the second scanning carriage scan, during use, over a first scanning axis and a second scanning axis respectively, the first scanning axis being orthogonal to the second scanning axis.

13. The apparatus as claimed in claim 11, wherein:
    the second energy source is to:
        pre-heat an area of a second build surface composed of the build material to the first temperature below the melting temperature or the glass transition temperature of the build material as the second scanning carriage moves over the second build surface during a another stage of use; and
    the first energy source is to:
        heat the area of the second build surface to the second temperature above the melting temperature or the glass transition temperature of the build material as the first scanning carriage moves over the second build surface during a further stage of use.

14. The apparatus as claimed in claim 11, wherein the first scanning carriage comprises an agent distributor to distribute an agent over the area of the build surface.

15. The apparatus as claimed in claim 11, wherein the second scanning carriage comprises a build material distributor to distribute the build material over the area of the build surface during use.

* * * * *